Nov. 13, 1962 G. B. BRUECKER 3,063,585
METHOD OF FORMING SILAGE DISCHARGE CHUTES
Filed Feb. 8, 1960
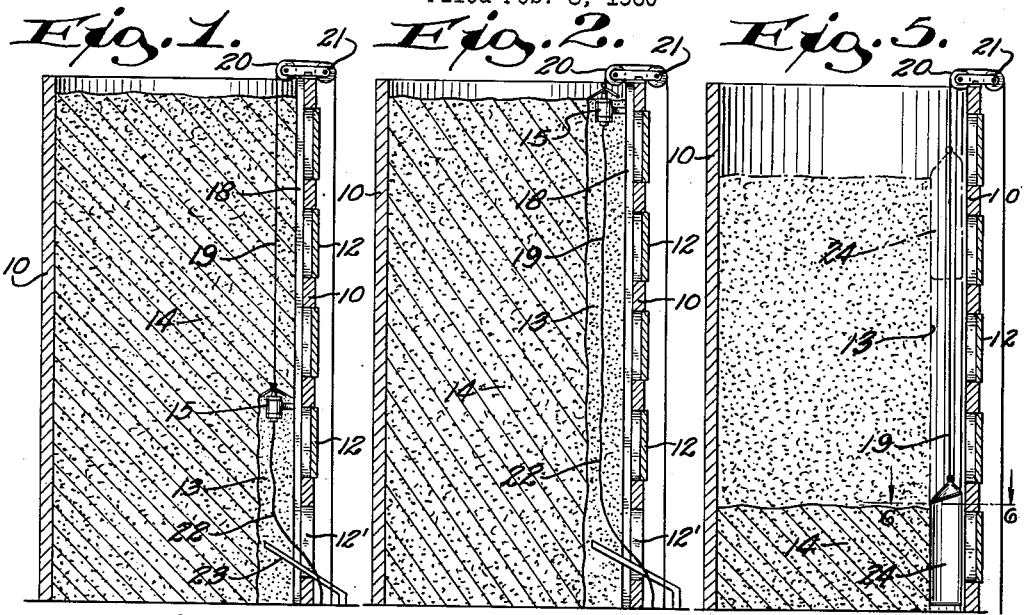
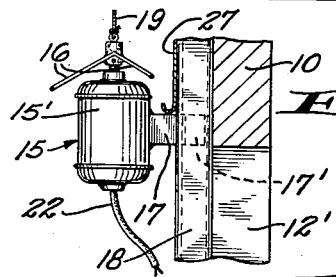
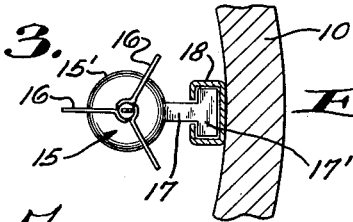
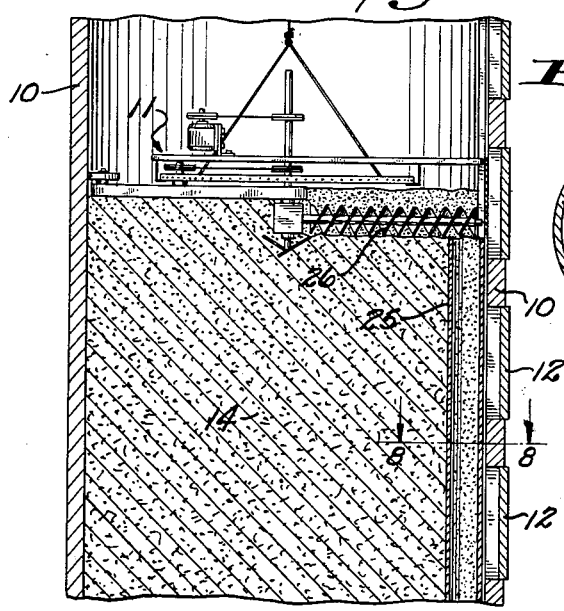
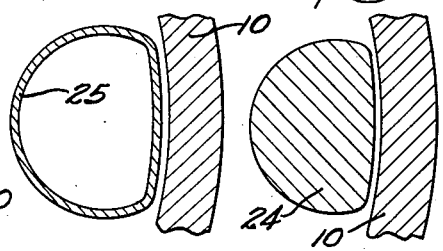
INVENTOR.
George B. Bruecker
BY
Morsell & Morsell
ATTORNEYS.

United States Patent Office 3,063,585
Patented Nov. 13, 1962

3,063,585
METHOD OF FORMING SILAGE
DISCHARGE CHUTES
George B. Bruecker, 1412 Oak Ridge, Kaukauna, Wis.
Filed Feb. 8, 1960, Ser. No. 7,404
2 Claims. (Cl. 214—152)

This invention relates to improvements in silage discharge chutes and methods of forming the same, and more particularly to silage discharge chutes positioned in the interior of a silo.

As is well known, the purpose of a silo is to provide storage space for cut crops so that the same can be utilized throughout the year for the purpose of feeding livestock. As the silage is needed, a desired amount is gathered from the upper surface and ejected through one of the vertically spaced doorways in the silo wall and into a chute attached to the silo exterior. The silage is then removed from the bottom of the chute and carried to the livestock feeding stations. Unfortunately, even with the advent of power-driven unloading machines, which automatically eject the feed from the silo, it is still necessary to climb up the silo wall and remove each succeeding door as the level of the silage descends, and for this reason the removal of feed from a silo is not only a difficult and time-consuming task, but in winter when the silo wall is covered with ice or snow, it can be extremely dangerous.

With the foregoing considerations in mind, it is the principal object of the present invention to provide an improved silage discharge chute arrangement whereby the unloading of feed from a silo is rendered easier and faster, and whereby the danger presently associated with that operation is avoided.

A more specific object of the invention is to provide a method of forming a silage discharge chute in the interior of a silo, thereby eliminating the need for an exterior chute, and making it unnecessary to remove the silo doors during the unloading operation.

The advantages of an interior discharge chute have been recognized for some time, but prior attempts to design such a structure have not been entirely successful and the devices have proved commercially impractical. Generally, such prior interior chutes have been in the form of a vertical tube or the like positioned centrally in the silo, there being a power-driven, radially extending conveyor positioned therebelow to catch the silage and carry it beyond the silo periphery. It was thought that such a tube must be centered in the silo for the reason that automatic unloading machines usually move the silage toward the center of the silo, from which point it is blown or otherwise conveyed radially outwardly through the doorways, and it was naturally believed that a centrally-positioned discharge chute was the most practical and efficient arrangement possible. It has been found with such devices, however, that the great weight of the packed silage directly over the radial conveyor positioned at the bottom of the tube necessitates an unusually strong, expensive conveyor and housing in order to support the weight thereabove. Moreover, in the event the power-driven conveyor becomes inoperative it is difficult to get access to the same for repair or replacement, resulting in costly and inconvenient delays.

In view of the foregoing, one of the specific objects of the present invention is to provide a method of forming interior discharge chutes adjacent the silo wall, rather than at the center of the silo, which is an entirely new concept and which arrangement eliminates the necessity for an elongated lateral conveyor extending radially beneath the silage, as is required with a discharge chute positioned centrally in the silo.

A further object of the present invention is to provide an interior silage discharge chute which comprises merely a vertical cavity in the silage, the packed silage forming the chute walls and there being no need for a special, costly tube or chute structure.

A further object is to provide a method of forming interior silage discharge chutes wherein the chute forming apparatus is especially adapted for use in conjunction with automatic silage unloading machines, and wherein little additional equipment or machinery is required.

Further objects of the present invention are to provide a method of forming a silage discharge chute in the interior of a silo, which method is simple and reliable, and wherein the chute formed thereby is unusually well adapted for its intended purpose.

With the above and other objects in view, the invention consists of the improved silage discharge chutes, and methods of forming the same, and all of their parts, combinations, and steps, as set forth in the claims, and all equivalents thereof.

In the accompanying drawing, illustrating the principal form of the invention and two modifications thereof, and wherein the same reference characters designate the same parts in all of the views:

FIG. 1 is a vertical sectional view of a silo showing the interior silage discharge chute comprising the present invention partially formed therein;

FIG. 2 is a view similar to FIG. 1 showing the completed discharge chute;

FIG. 3 is a side elevational view of the chute-forming device used in the principal form of the invention;

FIG. 4 is a top plan view of the device shown in FIG. 3;

FIG. 5 is a vertical sectional view of a silo showing a modification of the chute-forming device employed in the principal form of the invention;

FIG. 6 is a horizontal sectional view, taken along line 6—6 of FIG. 5, of the chute-forming device illustrated in FIG. 5;

FIG. 7 is a fragmentary vertical sectional view of a silo showing a modification of the principal form of discharge chute comprising the present invention; and FIG. 8 is a horizontal sectional view, taken along line 8—8 of FIG. 7, of the chute shown therein.

Referring now more particularly to the drawings, the numeral 10 designates the wall of a conventional cylindrical silo, such as are found on farms throughout the country. The purpose of such silos, of course, is to provide storage for cut crops so that the crops may be used as livestock feed throughout the year. In practice, the feed or silage 14 is usually discharged from the silo, as needed, by means of a mechanical unloader, such as the machine 11 shown in FIG. 7 (which is fully described in my copending application Serial No. 820,656, filed June 16, 1959). Ordinarily such machines collect a desired quantity of feed from the upper surface of the silage and eject the same through the adjacent doorway in the silo wall and into a vertical chute (not shown) attached to the exterior surface of the silo. The feed falls to the bottom of the chute and is then either manually or mechanically carried to the feeding stations. Even with such a highly mechanized system, however, it is necessary to remove each succeeding silo door 12 as the level of the silage descends, which is a laborious and sometimes dangerous job, as hereinbefore mentioned. To eliminate this task, the discharge chute 13, characterizing the present invention, is formed in the interior of the silo, as will be seen in the drawings, and there is no necessity for removing any but the lowermost door member.

In the form of the invention illustrated in FIGS. 1 and 2, the silage discharge chute 13 is formed in the interior of the silo by merely drawing a drill device 15 upwardly through the silage 14, leaving a cylindrical cavity therein extending the entire height of the silo. Silage which has been stored for some time becomes quite hard, of course, and even after the drill member 15 has been raised to the top of the silo, as illustrated in FIG. 2, the cavity or chute 13 retains its form. As will be readily appreciated, said chute provides a passageway for feed gathered from the upper portion of the silage by a mechanical unloader, and the positioning of the chute in the silo interior eliminates the necessity for removing the silo doors. The lowermost doorway 12' must be open, of course, to permit removal of the silage deposited in said chute.

In the construction illustrated in FIGS. 1 through 4, the drill member 15 comprises merely a small electric hand drill, such as are commonly used by carpenters, which drill has a plurality of special, radial blades 16 mounted for rotation on the top thereof, and a cord 22 operatively connecting the same to a source of power. The drill motor housing 15' is provided with a supporting arm 17 having a laterally-projecting, T-shaped outer end portion 17' adapted to slidably fit within a vertically disposed, channel-shaped rail or track 18 attached to the silo wall.

In silos equipped to employ an unloading machine such as the machine 11 shown in FIG. 7, the track 18 is already mounted on the silo wall, being the track on which said unloader travels, and there is no necessity for mounting a special track in the silo. In silos which are not so equipped, it is necessary, of course, to first secure the track on the silo wall. After the drill 15 has been mounted in said track, as described, a cable 19 is secured to the top portion of the drill and trained over a pair of sheaves 20 and 21 mounted at the top of the silo wall, said cable depending on the silo exterior and being secured at its lower end to a hand or power driven winch or the like (not shown) to provide means for moving the drill 15 upwardly through the packed silage.

In the illustrated construction, the vertical track 18 on which the chute-forming drill 15 rides is secured to the silo wall in alignment with the doors 12, so that access to the chute can be readily had by merely removing the lowermost door member, as described. It might be preferred in some instances, however, to position the track elsewhere on the circumference of the silo, and the invention is not to be limited to the exact arrangement shown. In the event the chute is formed at some point other than adjacent the silo doorways, it is necessary, of course, to provide an opening through the silo wall communicating therewith to permit withdrawal of the silage.

In the use of the drill device comprising the principal form of the invention, the drill may be positioned in the silo before the latter is filled, or a hollow space may be formed therefor in the filled silo. When it is desired to form the cavity or chute 13 for the purpose of removing feed, the drill is merely turned on and drawn upwardly through the packed silage by means of the aforementioned cable 19, the blades 16 cutting a cylindrical bore or cavity upwardly through the silage. In the construction illustrated in FIGS. 1 and 2 it will be seen that an inclined ramp or deflector 23 is projected through the lowermost doorway 12' and into the chute for the purpose of directing the silage to the exterior of the silo, where it is collected and manually or automatically conveyed to the livestock feeding stations. To prevent silage from becoming packed within the channel-shaped track member 18, and impeding the smooth upward travel of the drill during the boring operation, a strip of masking tape 27 or the like (FIG. 3) may be secured over the slotted opening in said track prior to the filling of the silo. As the drill moves upwardly on the track the masking tape is easily dislodged, of course, and does not interfere with the travel of said drill.

As will be appreciated from the foregoing description, the novel interior chute 13, which is, in reality, a cavity formed in the packed silage, is formed after the silo has been loaded with feed which means that the entire capacity of the silo may be utilized for storage purposes. Moreover, of course, the positioning of the cavity adjacent the silo wall permits the withdrawal of feed from the silo by means of a simple ramp or deflector 23, and there is no necessity for a complex and expensive radial conveyor such as is required with a chute positioned at the center of a silo.

As hereinbefore mentioned, the drill member 15 is particularly designed for use in a silo equipped with an unloading machine such as the machine 11 illustrated in FIG. 7. Such silos are provided with a vertical, channel-shaped track 18 and it is a simple matter to mount the drill assemblage 15 therein. In silos which are not adapted for such machines, however, the chute 13 may be formed by means of a device such as that illustrated in FIGS. 5 and 6, which will now be described.

Generally, the modified chute forming device disclosed in FIGS. 5 and 6 comprises an elongated torpedo or dummy 24, formed of wood or other relatively inexpensive material, which is attached to a winch or the like by means of a cable 19 in a manner similar to that described with respect to the drill unit illustrated in FIGS. 1 and 2. As shown in FIG. 6, said torpedo has a generally circular horizontal cross-section and is designed to form a cylindrical cavity adjacent the silo wall similar to that formed by said drill device 15.

In the use of the modified chute-forming apparatus, the torpedo 24 is positioned in the silo before the latter is filled. As the feed enters the silo it packs itself around the torpedo, and as the level of the silage rises, the torpedo must be simultaneously raised by means of the cable 19, leaving a hollow space in the silage therebelow. As shown in dot and dash lines in FIG. 5, when the level of the silage approaches the top of the silo, the torpedo 24 has formed a discharge cavity or chute 13 the entire height of the silo. The advantage of the modified chute-forming device, of course, is that it is less expensive both in construction and operation than the electric drill apparatus 15.

A further modification of the silage discharge chute comprising the present invention is illustrated in FIGS. 7 and 8. In this variation the chute 25 is in the form of an elongated tube constructed of paperboard or similar disposable material. Said tube is positioned in the silo prior to the filling thereof, of course, and as the unloading machine 11 descends in the silo the tube is chewed up and disintegrated thereby, said tube becoming part of the silage. Preferably, said tube is formed of a feed pulp material so that when it becomes integrated with the silage it will add food value thereto. In its illustrated form said chute 25 is an elongated, one-piece member, but it might be preferred to construct the same in several shorter sections, positioned one on top of the other, and the invention is not to be limited in this respect.

As will be readily appreciated from the foregoing detailed description of the principal form of the invention and the modifications illustrated in FIGS. 5 through 8, the present invention provides a simple and practical method of forming silage discharge chutes in the interior of a silo, thereby greatly facilitating unloading as well as avoiding the danger formerly associated with that operation. Moreover, by positioning the discharge chute adjacent the silo wall, rather than in the center of the silo, the necessity for an expensive radial conveyor is avoided.

It is to be understood, of course, that various changes and further modifications may be made in both the silage discharge chutes above described and in the methods of forming the same, without departing from the spirit of the invention, and all of such changes and modifications are contemplated as may come within the scope of the following claims.

What I claim is:

1. A method of forming a silage discharge chute in a silo having an opening through the lower portion of its wall, comprising: securing a vertical track on the inner surface of the silo wall adjacent said opening, mounting a power driven drill on the lower portion of said track adjacent said opening in a manner permitting its vertical travel thereon, filling the silo with silage, actuating the drill, moving the drill upwardly along the track and through the silage to cut a vertical cavity in the silage communicating with said wall opening, and removing the silage from the lower end of the vertical cavity through said opening.

2. A method of forming a silage discharge chute in a silo having an opening in the lower portion of its wall, comprising the steps of positioning a vertical guide member adjacent the inner surface of the silo wall with the lower end of the guide member being located adjacent the opening in said wall, attaching a cutting unit, including a power driven cutter having a series of rotating blades, to the lower end of the guide member, filling the silo with silage, actuating the cutter, moving the cutting unit upwardly along the silo wall and through the silage contained within the silo with the blades cutting a vertical cavity in the silage communicating with the opening in the wall, and removing the cut silage from the lower end of the vertical cavity through said opening.

References Cited in the file of this patent

UNITED STATES PATENTS

| | | |
|---|---|---|
| 2,500,043 | Radtke | Mar. 7, 1950 |
| 2,690,850 | Welker | Oct. 5, 1954 |
| 2,863,576 | Trask | Dec. 9, 1958 |
| 2,868,400 | Powischill et al. | Jan. 13, 1959 |
| 2,911,116 | Anderson | Nov. 3, 1959 |
| 2,941,677 | Korber | June 21, 1960 |

FOREIGN PATENTS

| | | |
|---|---|---|
| 86,205 | Netherlands | Sept. 16, 1957 |